(12) United States Patent
Gao et al.

(10) Patent No.: US 11,150,989 B2
(45) Date of Patent: Oct. 19, 2021

(54) METHOD, DEVICE AND COMPUTER PROGRAM PRODUCT FOR MANAGING A STORAGE SYSTEM

(71) Applicant: EMC IP Holding Company LLC, Hopkinton, MA (US)

(72) Inventors: Jian Gao, Beijing (CN); Ree Lei Sun, Beijing (CN); Shaoqin Gong, Beijing (CN); Jibing Dong, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 16/021,636

(22) Filed: Jun. 28, 2018

(65) Prior Publication Data
US 2019/0004900 A1   Jan. 3, 2019

(30) Foreign Application Priority Data
Jun. 30, 2017 (CN) .......................... 201710526301.1

(51) Int. Cl.
*G06F 11/00* (2006.01)
*G06F 11/10* (2006.01)
*G06F 3/06* (2006.01)

(52) U.S. Cl.
CPC ........ *G06F 11/1092* (2013.01); *G06F 3/0607* (2013.01); *G06F 3/0619* (2013.01); *G06F 3/0632* (2013.01); *G06F 3/0634* (2013.01); *G06F 3/0638* (2013.01); *G06F 3/0689* (2013.01); *G06F 11/1084* (2013.01)

(58) Field of Classification Search
CPC ............ G06F 11/1092; G06F 11/1076; G06F 11/1084; G06F 2211/1057; G06F 11/1469; G06F 11/3055; G06F 2211/1035; G06F 2211/104
See application file for complete search history.

(56) References Cited

U.S. PATENT DOCUMENTS

| | | |
|---|---|---|
| 6,792,506 B2 | 9/2004 | Robert et al. |
| 7,209,979 B2 | 4/2007 | Robert et al. |
| 7,752,389 B1 | 7/2010 | Qun |
| 8,065,558 B2 * | 11/2011 | Zwisler ............... G06F 11/2094 714/6.2 |
| 8,782,463 B1 * | 7/2014 | Singh .................. G06F 11/1469 714/6.22 |

(Continued)

*Primary Examiner* — Loan L. T. Truong
(74) *Attorney, Agent, or Firm* — BainwoodHuang

(57) ABSTRACT

Embodiments of the present disclosure provide method, device and computer program product for managing a storage system. The storage system includes a disk having a plurality of extents. The method comprises obtaining metadata associated with an RAID stripe in a first RAID of a first type, the first RAID including at least a part of extents from the plurality of extents. The method also comprises allocating an additional extent to the RAID stripe. The method further comprises converting, based on the allocated additional extent and by modifying the metadata, the first RAID of the first type into a second RAID of a second type in a degraded mode. Additionally, the method comprises initiating, based on the modified metadata, a rebuilding process for the second RAID, so as to convert the second RAID from the degraded mode to a normal mode.

12 Claims, 8 Drawing Sheets

(56) References Cited

U.S. PATENT DOCUMENTS

| | | | | |
|---|---|---|---|---|
| 8,782,465 B1* | 7/2014 | Foley | G06F 11/1443 |
| | | | | 714/6.21 |
| 8,812,902 B2* | 8/2014 | Deepak | G06F 11/2094 |
| | | | | 714/6.21 |
| 8,839,028 B1* | 9/2014 | Polia | G06F 11/1084 |
| | | | | 714/6.24 |
| 9,256,381 B1* | 2/2016 | Fultz | G06F 16/185 |
| 9,286,004 B1* | 3/2016 | Puhov | G06F 3/0655 |
| 9,600,368 B2 | 3/2017 | Bonwick | |
| 9,842,084 B2* | 12/2017 | Friedman | G06F 15/167 |
| 10,013,324 B2* | 7/2018 | Blea | G06F 11/2069 |
| 10,289,507 B1* | 5/2019 | Malwankar | G06F 3/067 |
| 10,365,983 B1* | 7/2019 | Foley | G06F 11/2094 |
| 10,489,412 B2* | 11/2019 | Isherwood | G06F 11/1435 |
| 2007/0245082 A1* | 10/2007 | Margolus | G06F 11/1096 |
| | | | | 711/114 |
| 2011/0029711 A1* | 2/2011 | Dhuse | G06F 11/1076 |
| | | | | 711/4 |
| 2011/0246716 A1* | 10/2011 | Frame | G06F 11/1076 |
| | | | | 711/114 |
| 2012/0079190 A1* | 3/2012 | Colgrove | G06F 3/0689 |
| | | | | 711/114 |
| 2012/0079317 A1* | 3/2012 | Nelogal | G06F 11/1092 |
| | | | | 714/6.22 |
| 2015/0205668 A1* | 7/2015 | Sundaram | G06F 3/0689 |
| | | | | 714/6.24 |
| 2016/0019114 A1* | 1/2016 | Han | G06F 11/1076 |
| | | | | 714/764 |
| 2016/0092109 A1* | 3/2016 | Wu | G06F 3/0689 |
| | | | | 711/114 |
| 2016/0259588 A1* | 9/2016 | Vellimalai | G06F 11/1092 |
| 2017/0090778 A1* | 3/2017 | Ishiguro | G06F 3/0611 |
| 2017/0270018 A1* | 9/2017 | Xiao | G06F 3/0617 |
| 2019/0188099 A1* | 6/2019 | Roberts | G06F 11/1092 |

* cited by examiner

METHOD, DEVICE AND COMPUTER PROGRAM PRODUCT FOR MANAGING A STORAGE SYSTEM

FIELD

This application claim priority from Chinese Patent Application Number CN 201710526301.1, filed on Jun. 30, 2017 at the State Intellectual Property Office, China, titled "METHOD, APPARATUS, AND COMPUTER PROGRAM PRODUCT FOR MANAGING A STORAGE SYSTEM" the contents of which is herein incorporated by reference in its entirety.

FIELD

Embodiments of the present disclosure generally relate to the field of data storage, and more specifically, to method, device and computer program product for managing a storage system.

BACKGROUND

A storage system usually has a plurality of disks which can be organized into a disk array. For example, a Redundant Array of Independent Disks (RAID) is a data storage virtualization technology that organizes a plurality of disks into a single logic unit for the purpose of data redundancy and/or performance improvement. Taking the traditional RAIDS for example, one RAID group (RG) can include a group of physical disks that can be split into block-level stripes having distributed parity information. In addition, there usually exists a spare disk for the RG. When a single disk in the RG breaks down, the subsequent reads can be performed by using the distributed parity information, such that no data is lost. Meanwhile, the spare disk can be selected to replace the faulty disk, and all of data on the faulty disk can be rebuilt and written into the spare disk.

However, with the development of storage technology, the number of disks in a single RG has been increasing year by year, and thus the probability of simultaneous failure of two disks has increased significantly. In RAID 5, if two disks in the RG fail simultaneously, it will cause user data loss. Therefore, the growing number of disks in the single RG will significantly increase the probability of user data loss.

SUMMARY

Embodiments of the present disclosure provide method, device and computer program product for managing a storage system.

In a first aspect of the present disclosure, there is provided a method for managing a storage system. The storage system includes a disk having a plurality of extents. The method comprises obtaining metadata associated with an RAID stripe in a first RAID of a first type, the first RAID including at least a part of extents from the plurality of extents. The method also comprises allocating an additional extent to the RAID stripe. The method further comprises converting, based on the allocated additional extent and by modifying the metadata, the first RAID of the first type into a second RAID of a second type in a degraded mode. Additionally, the method comprises initiating, based on the modified metadata, a rebuilding process for the second RAID, so as to convert the second RAID from the degraded mode to a normal mode.

In a second aspect of the present disclosure, there is provided a device for managing a storage system including a disk array. The device comprises at least one processing unit and at least one memory. The at least one memory is coupled to the at least one processing unit and stores instructions for execution by the at least one processing unit. The instructions, when executed by the at least one processing unit, cause the device to perform actions comprising: obtaining metadata associated with an RAID stripe in a first RAID of a first type, the first RAID including at least a part of extents from the plurality of extents; allocating an additional extent to the RAID stripe; converting, based on the allocated additional extent and by modifying the metadata, the first RAID of the first type into a second RAID of a second type in a degraded mode; and initiating, based on the modified metadata, a rebuilding process for the second RAID, so as to convert the second RAID from the degraded mode to a normal mode.

In a third aspect of the present disclosure, there is provided a computer program product tangibly stored in a non-transient computer storage medium and including machine-executable instructions. The machine-executable instructions, when executed by a device, cause the device to execute any step of the method according to the first aspect of the present disclosure.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

The preferred embodiments of the present disclosure will be described in more details with reference to the drawings. Although the drawings illustrate the preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same of different objects. The following text can comprise other explicit and implicit definitions.

Figure 1:
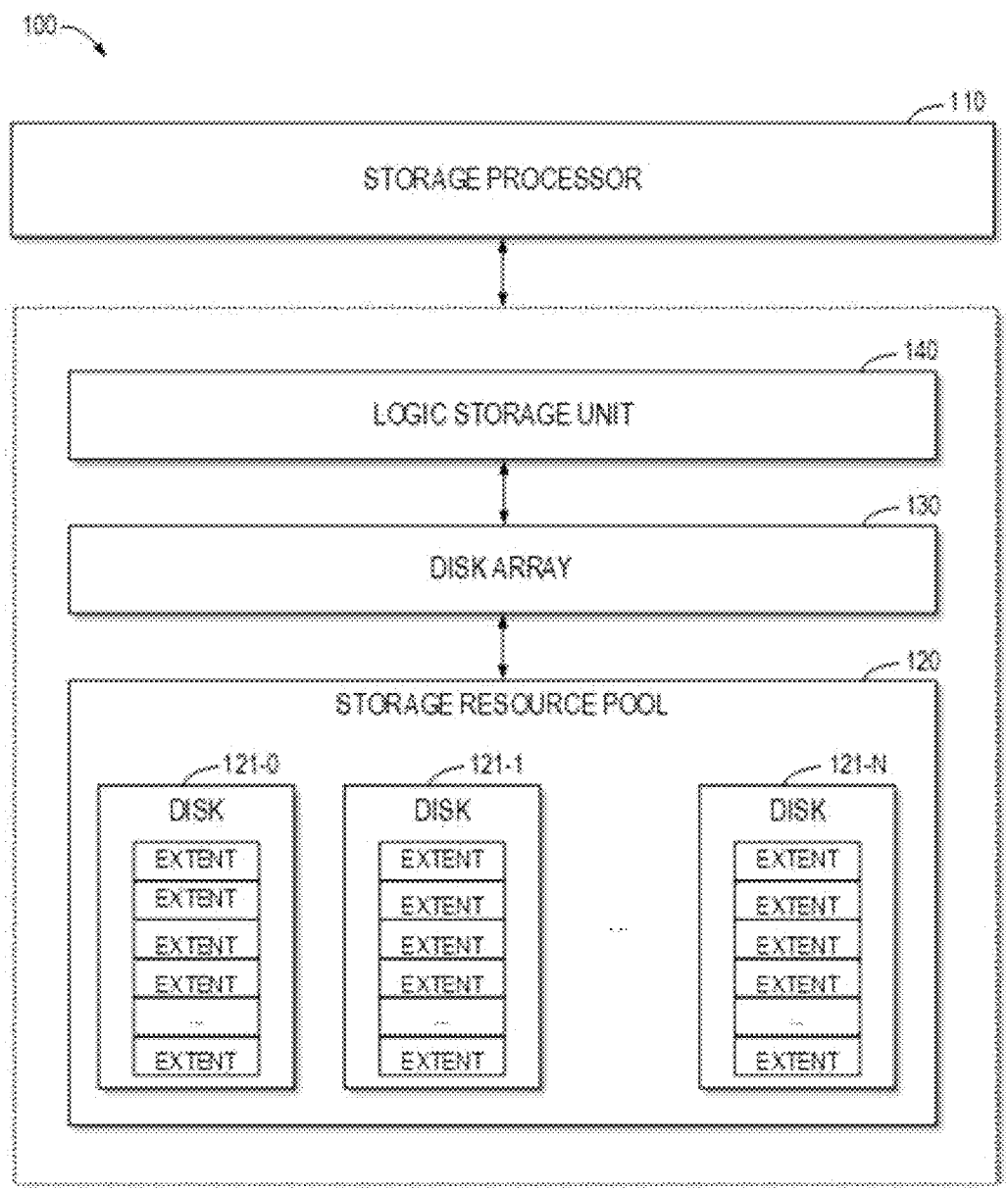
FIG. 1 illustrates an architecture diagram of a storage system according to embodiments of the present disclosure.

FIG. 1 illustrates an architecture diagram of a storage system 100 according to embodiments of the present disclosure. As shown in FIG. 1, the storage system 100 may include storage processor 110 and a storage resource pool 120. It is to be understood that structure and function of the storage system 100 as shown in FIG. 1 are only for the purpose of examples without suggesting any restrictions over the scope of the present disclosure. Embodiments of the present disclosure can be embodied in different structures and/or functions.

As shown in FIG. 1, the storage resource pool 120 may include one or more disks 121-0, 121-1, . . . , 121-N (collectively known as disk(s) 121). As used herein, a "disk" refers to any currently known or to be developed non-volatile storage medium, such as magnetic disk, optical disk or Solid State Disk (SSD) and the like. In the description of the text, the magnetic disk will be taken as an example of the disk. However, it is to be understood that this is only for the purpose of description without suggesting any limitations to the scope of the present disclosure.

Each of the disks 121 can be divided into a plurality of extents. For example, the storage processor 110 can organize at least a part of the plurality of extents into one or more disk arrays 130. Besides, the disk array 130, for example, can provide one or more logic storage units 140 (e.g., Logic Unit Numbers (LUNs)) to an upper-layer application (not shown) for operation. For the purpose of description, FIG. 1 only illustrates one disk array 130 and one logic storage unit 140. However, it is to be understood that embodiments of the present disclosure can also be embodied in different number of disk arrays and/or logic storage units, and the scope of the present disclosure is not limited in this regard.

The disk array 130, for example, can be a Redundant Array of Independent Disks (RAID), which normally combines a plurality of physical storage units into a logic storage unit for the purpose of data redundancy and/or performance improvement. According to the required level of redundancy and performance, it may have different types, such as RAID 0, RAID 1, . . . , RAID 5 and so on. The disk array 130 may include one or more disk array groups (i.e., RGs), and each of the disk array groups can be comprised of a plurality of RAID stripes. A RAID stripe can include a data extent for storing user data and a parity extent for storing parity information. Take the RAID 5 in the layout of 4D+1P as an example, wherein each RAID stripe can consist of four data extents and one parity extent. In the following description, the 4D+1P RAID 5 will be taken as the example of the disk array 130. However, it is to be understood that this is only for the purpose of description, without suggesting any limitations to the scope of the present disclosure.

In traditional RAID implementations, the RAID algorithm is usually operated on the entire physical disks. For example, RGs in the traditional RAID will consume all of spaces of the occupied physical disks to store data and parity information. Moreover, taking the traditional RAID 5 as an example, a complete physical disk is usually reserved for the RGs as a spare disk to serve the rebuilding of a faulty disk in a RG.

Figure 2:
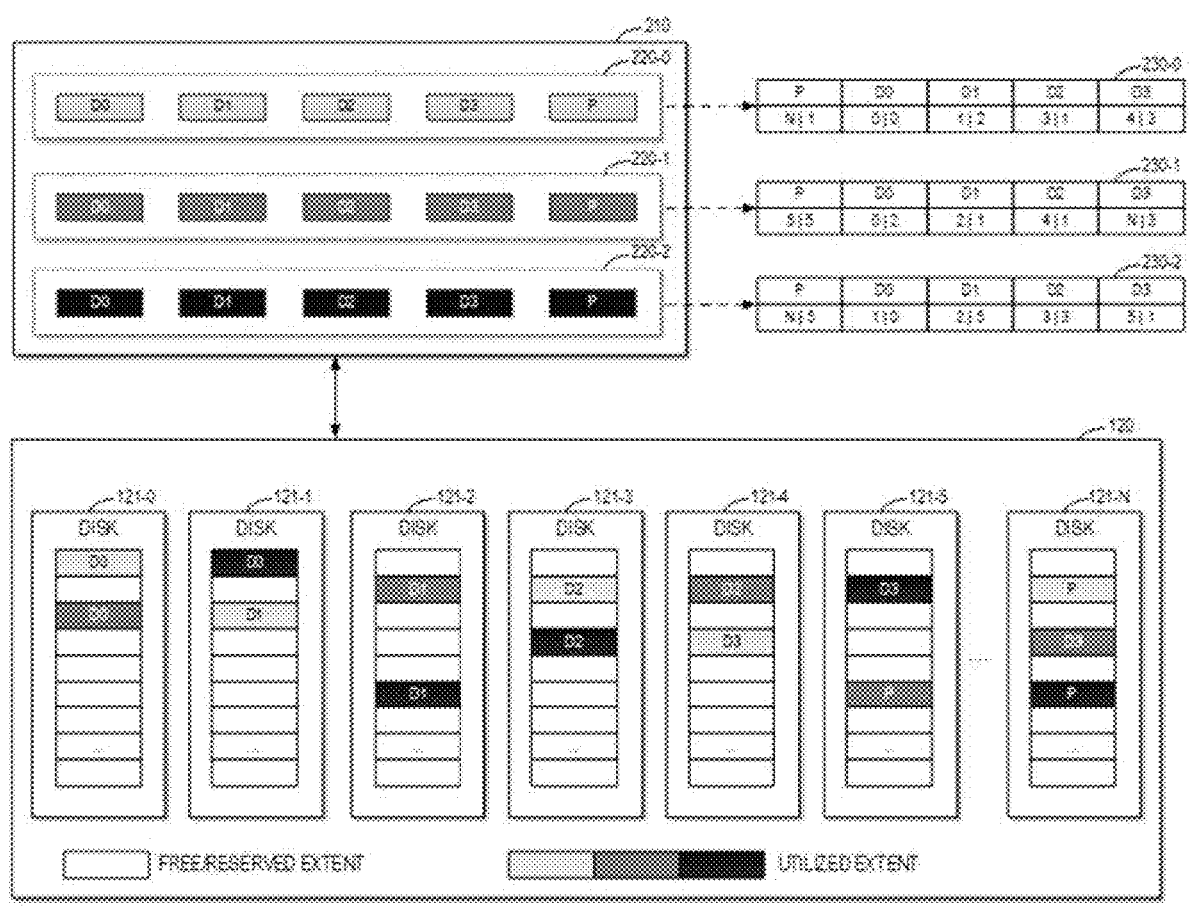
FIG. 2 illustrates a schematic diagram of exemplary layout of a disk array group according to embodiments of the present disclosure.

Different from the traditional RAID implementations, in some embodiments, the disk array 130 as shown in FIG. 1 can also be constructed based on the extents of the physical disks 121. That is, in the disk array 130 as shown in FIG. 1, the RAID algorithm can operate on the extents of different physical disks instead of the entire physical disks. FIG. 2 illustrates a schematic diagram of an exemplary layout of a disk array group 210 in a disk array 130 according to embodiments of the present disclosure.

As shown in FIG. 2, the RG 210 employs N+1 disks (such as, N+1>5), i.e., the disks 121-0, 121-1, . . . , 121-N as shown in FIG. 1. Each of the disks 121 is divided into a plurality of extents, and the RG 210 only utilizes a part of the plurality of extents. According to FIG. 2, the RG 210, for example, may include 3 RAID stripes 220-0, 220-1 and 220-2 (collectively referred to as RAID stripe(s) 220). These RAID stripes 220 are uniformly distributed in all of the disks 121. Each of the RAID stripes may include four data extents (i.e., the extents for storing user data D0-D3) and one parity extent (i.e., the extent for storing parity information P), and these data extents and parity extent may be distributed in five different disks, respectively.

In some embodiments, the mapping relationship between the extents and the RAID stripes can be recorded in a data structure, which is referred to as a "mapping table" for example. The mapping table, for example, can be created along with the establishment of the RG 210, and is stored in a metadata region of the RAID stripes. For instance, FIG. 2 illustrates mapping tables 230-0, 230-1 and 230-2 (collectively known as mapping table(s) 230) corresponding to the RAID stripes 220-0, 220-1 and 220-2 respectively. Each entry in the mapping table 230 may record that each of the user data (i.e., D0-D3) and the parity information (i.e., P) in a respective RAID stripe 220 is specifically stored in which extent of which disk. Take the mapping table 230-0 as an example, where the value of the entry associated with the parity information P is "N|1," which indicates that the parity information P in the RAID stripe 220-0 is stored in the first extent of the N-th disk (i.e., the disk 121-N). The value of the entry associated with the user data D0 is "0|0," which indicates that the user data D0 in the RAID stripe 220-0 is stored in the 0th extent of the 0th disk (i.e., the disk 121-0). The value of the entry associated with the user data D1 is "1|2," which indicates that the user data D1 in the RAID stripe 220-1 is stored in the 2nd extent of the 1st disk (i.e., disk 121-1), and so on. The spatial layout of the RAID stripes will be further described in details with reference to FIG. 6 in the following.

Figure 3:
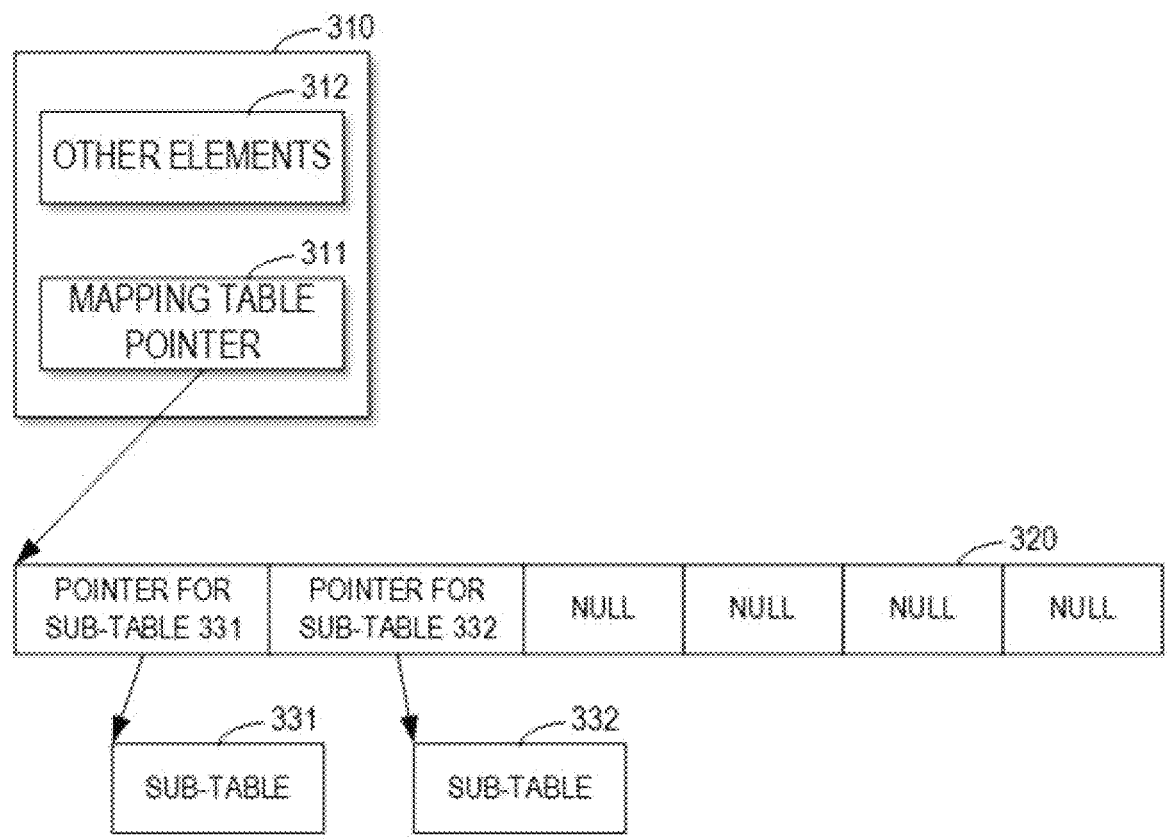
FIG. 3 illustrates a schematic diagram of a mapping table of RAID stripes loaded into a memory according to embodiments of the present disclosure.

As described above, in some embodiments, the storage processor 110 can create, for example, in response to a request from an upper-layer application, one or more logic storage units 140 (e.g., LUNs) on the RG 210 for operations of the upper-layer application. For example, the logic storage units 140 may be associated with one or more RAID stripes in the RG 210. When a logic storage unit 140 serves an I/O operation from the upper-layer application, the mapping table corresponding to the one or more RAID stripes can be accessed, so as to route the I/O request from the upper-layer application to a respective disk. Accordingly, in some embodiments, when an object is created for the logic storage unit 140, the mapping table corresponding to the one or more RAID stripes can be loaded into the memory to enhance access efficiency. FIG. 3 illustrates a schematic diagram of an exemplary mapping table loaded into the memory according to the embodiments of the present disclosure.

As shown in FIG. 3, for example, an object 310 for the logic storage unit 140 can be created in response to a request from the upper-layer application. The object 310 may include a pointer 311 pointing to a global mapping table vector 320 and one or more other elements 312. For example, the mapping table for the one or more RAID stripes associated with the logic storage unit 140 can be split into a plurality of sub-tables (such as, sub-table 331 and sub-table 332) with an identical memory footprint, and the pointers respectively pointing to these sub-tables can be stored in the global mapping table vector 320. For example, each of the sub-tables may record mapping information about a part of the one or more RAID stripes, which describes a continuous space in the capacity of the logic storage unit 140. In some embodiments, when the capacity of the logic storage unit 140 expands, the storage processor 110 may allocate an additional extent to the logic storage unit 140 from the storage resource pool 120, and fill the mapping information associated with the additional extent into a free entry in a respective sub-table. When the sub-table is full, a new sub-table can be allocated and initialized. Meanwhile, a pointer pointing to the new sub-table can be added into the global mapping table vector 320. When the capacity of the logic storage unit 140 shrinks, a part of RAID stripes associated with the logic storage unit 140 can be de-allocated, and the mapping information of the part of RAID stripes in a respective sub-table can be removed. When all of the mapping information in the sub-table is removed, the sub-table can be de-allocated and the pointer pointing to the sub-table can be removed from the global mapping table vector 320.

Returning back to FIG. 2, in addition to the extents for the RGs 210, some free extents (such as, blank extents as shown in FIG. 2) may be reserved on each of the disks 121 as spare extents. This is different from the traditional RAID 5, which reserves the whole disk as the spare disk. When a certain disk fails, a free extent on other disks can be randomly selected for each of utilized extents on the faulty disk as replacement. For example, FIG. 4 illustrates a schematic diagram of an exemplary rebuilding process for the RG 210 as shown in FIG. 2.

Figure 4:
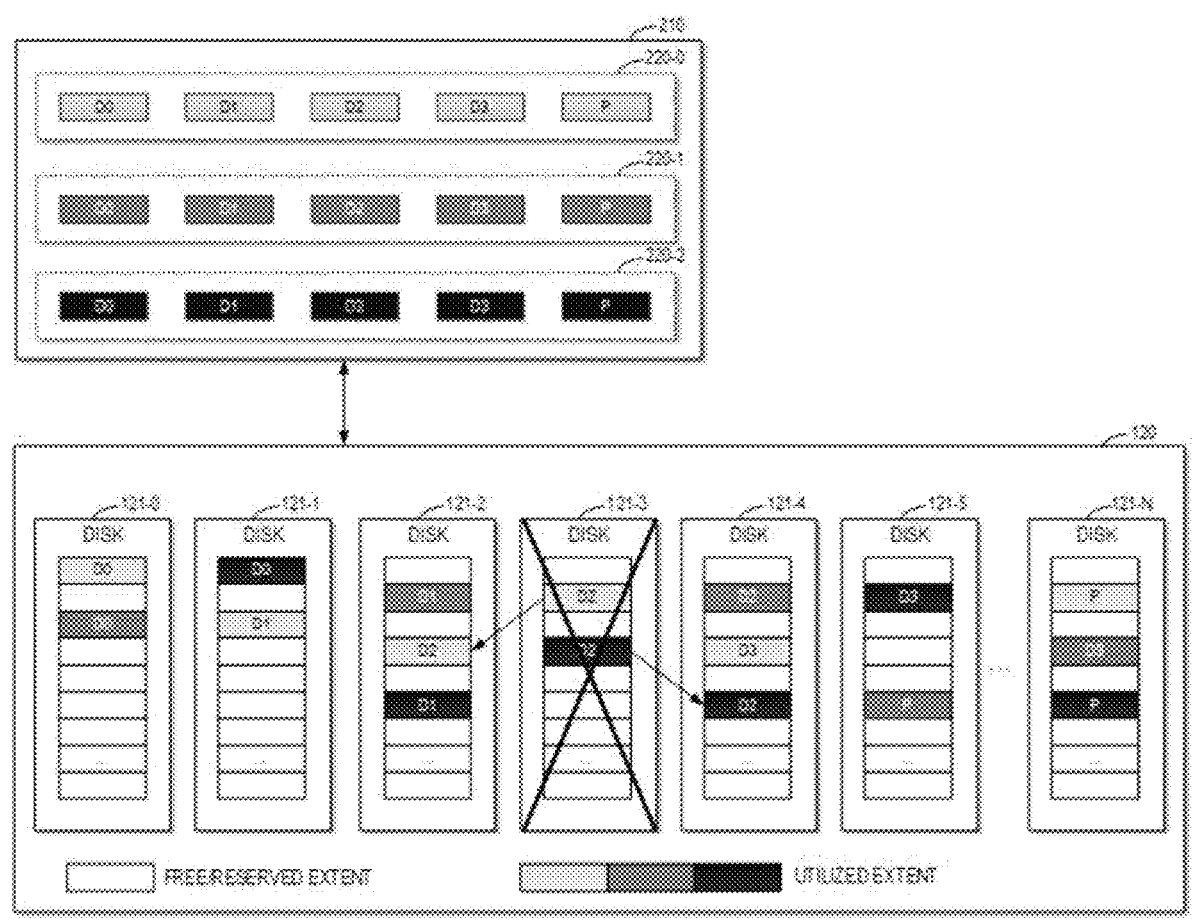
FIG. 4 illustrates a schematic diagram of a rebuilding process of a disk array group according to embodiments of the present disclosure.

As shown in FIG. 4, if the disk 121-3 in the RG 210 fails, for each of utilized extents for the disk 121-3 (i.e., the extent where the user data D2 in the RAID stripe 220-0 is located and the extent where the user data D2 in the RAID stripe 220-2 is located), one free extent on other disks can be randomly select as replacement. For example, the user data D2 in the RAID stripe 220-0 can be rebuilt and written into a free extent of the disk 121-2, while the user data D2 in the RAID stripe 220-2 can be rebuilt and written into a free extent of the disk 121-4.

With the development of the storage technology, the number (N+1) of the disks in the RG 210 has been increasing year by year, and thus the probability of simultaneous failure of two disks has increased significantly. However, in RAID 5, if two disks in a RG fail simultaneously, it will cause user data loss. Therefore, the growing number of disks in the RG 210 will significantly increase the probability of user data loss.

In order to solve the above problem and one or more of other potential problems, example embodiments of the present disclosure provide a solution for managing a storage system. The solution converts a RG from one type (e.g., RAID 5) into another type (e.g., RAID 6) by allocating an additional extent to each of RAID stripes in the RG and modifying the metadata associated with the each of RAID stripes. With the conversion of the RAID type, this solution can improve its reliability without impacting user I/Os for the RG (for example, RAID 6 can tolerate simultaneous failures of two disks, while RAID 5 can only tolerate failures of one disk). Furthermore, during the above conversion process, the present solution requires no additional data migration compared with the traditional RAID type conversion, which results into relatively less system overheads (such as, time and resource expenses and the like). In particular, the present solution ensures atomicity of the entire conversion process with transactions. Therefore, even if some operation fails during the conversion process, it will not impact availability of the entire storage system.

For the purpose of facilitating the description, embodiments of the present disclosure will be described by taking the conversion from RAID 5 to RAID 6 as an example. However, it is to be understood that embodiments of the present disclosure can also be embodied in conversions among other disk array types, and the scope of the present disclosure is not limited in this regard.

Figure 5:
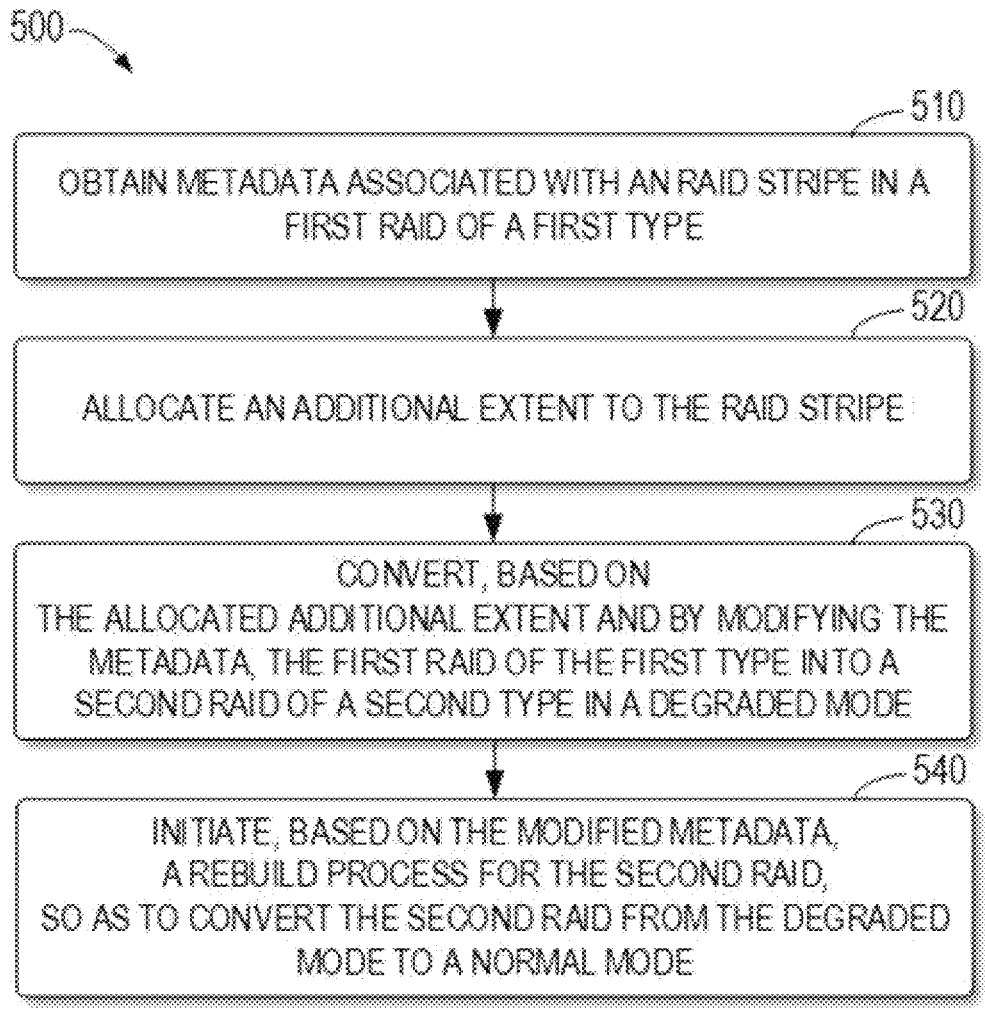
FIG. 5 illustrates a flowchart of an exemplary method for managing a storage system according to embodiments of the present disclosure.

FIG. 5 illustrates a flowchart of a method 500 for managing a storage system according to embodiments of the present disclosure. Actions involved in the method 500 are described below with reference to the storage system 100 as shown in FIG. 1. For example, in some embodiments, the method 500 may be executed by the storage processor 110. Besides, the method 500 will be described with reference to the disk array 130, wherein the disk array 130 is RAID 5 having the layout as shown in FIG. 2, for example. In the following description, the disk array 130 having a type of RAID 5 is also known as "first RAID," and "RAID 5" is also referred to as "first type." It is to be understood that this is only for the purpose of description without suggesting any limitations to the scope of the present disclosure. Moreover, the method 500 may also include some additional actions not shown and/or omit some shown actions, and the scope of the present disclosure is not limited in this regard.

At block 510, the storage processor 110 obtains metadata associated with a RAID stripe in the disk array 130 having a type of RAID 5 to be converted. In some embodiments, for each of the RAID stripes in the disk array 130, the obtained metadata may include a first metadata recording configuration information of the RAID stripe and a second metadata recording state information of the RAID stripe.

For example, Table 1 and Table 2 respectively illustrate the exemplary fields and their meanings included in the first and second metadata. It is seen from Table 1 and Table 2 that the first metadata records basic configuration information related to the type of the RAID stripe (e.g., RAID 5), while the second metadata records information associated with rebuild of the RAID stripe.

TABLE 1

| Field | Meanings |
|---|---|
| Valid bit | Indicating whether the first metadata is valid or not |
| Logic storage unit identifier | Indicating the identifier of the logic storage unit to which the RAID stripe belongs |
| RAID identifier | Indicating the identifier of the RAID to which the RAID stripe belongs |
| RAID type | Indicating the RAID protection level of the RAID stripe (e.g., RAID 5 etc.) |
| Width | Indicating the number of disk extents included in the RAID stripe (e.g., 5) |
| Disk extent size | Indicating the size of each of disk extents in the RAID stripe (e.g., the number of storage blocks included in each disk extent) |
| Mapping table | Indicating mapping relationship between the RAID stripe and the disk extents (e.g., mapping table 230 as shown in FIG. 4) |

TABLE 2

| Field | Meanings |
|---|---|
| Valid bit | Indicating whether the second metadata is valid or not |
| Rebuild position | Indicating mask of the disk extent in need of rebuild, and/or other position information associated with rebuild |
| Rebuild identifier | Indicating whether rebuild is enabled or not |

It is to be understood that fields included in the first metadata and the second metadata as shown in Table 1 and Table 2 are only for the purpose of examples without suggesting any limitations to the scope of the present disclosure. In some embodiments, the first metadata and/or the second metadata can further include additional fields not shown and/or omit the shown fields, and the scope of the present disclosure is not limited in this regard.

Figure 6:
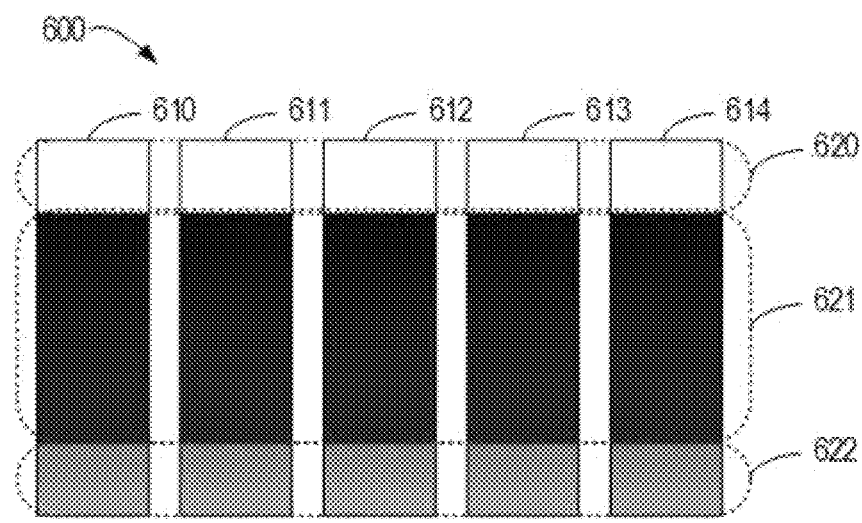
FIG. 6 illustrates a schematic diagram of spatial layout of RAID stripes according to embodiments of the present disclosure.

In some embodiments, the first metadata and the second metadata can be stored in a metadata region of the RAID stripe. In other words, the storage processor 110 can obtain, from the metadata region of the RAID stripe, the first metadata and the second metadata associated with the RAID stripe. For example, FIG. 6 illustrates a schematic diagram of spatial layout of an RAID stripe 600 of the first type (i.e., RAID 5 type). As shown in FIG. 6, the RAID stripe 600 may include five extents 610-614. In some embodiments, the entire space of the RAID stripe 600 can be split into three regions 620-622. For example, the first metadata can be stored in the region 620 (i.e., at the top of each extent), data (such as user data or parity information) can be stored in the region 621 (i.e., in the middle of each extent), and the second metadata can be stored in the region 622 (i.e., at the bottom of each extent). Additionally or alternatively, in some embodiments, the first metadata can be mirrored and stored at the top of each extent, i.e., the first metadata stored in each extent of the RAID stripe 600 is the same. The first metadata is usually small, so in some embodiments, the first metadata can be loaded into memory at the start-up of the storage system to improve subsequent access performance. In some embodiments, for example, user data and parity information can be stored in the region 621 in a fashion similar to RAID 5 (e.g., 4D+1P). Further, the second metadata can also be stored in the region 622 in a fashion similar to the data region. In other words, the second metadata can be stored at the bottom of each extent in the manner of 4D+1P RAID 5. In some embodiments, the size of the region for storing data in each extent can be predefined. Additionally or alternatively, in some embodiments, the size of the region for storing the first metadata and/or the second metadata in each extent can be determined based on the spatial size of the RAID stripe 600.

Returning back to FIG. 5, the method 500 proceeds to block 520, where the storage processor 110 allocates an additional extent to the RAID stripe. In some embodiments, for example, for each of RAID stripes in the disk array 130, the storage processor 110 can select a respective free extent from a certain disk 121 in the storage resource pool 120 for allocation. Additionally or alternatively, in some embodiments, the disk where the allocated additional extent locates may be different from the disk where the original five extents in the RAID stripe are positioned. That is, the six extents (each stripe in the RAID 6 including six extents) in the RAID stripe can be distributed on different physical disks through the allocation.

At block 530, the storage processor 110 converts, based on the allocated additional extent, the disk array 130 from RAID 5 to RAID 6 (also known as "second RAID" in the text) in a degraded mode by modifying the metadata associated with the RAID stripe.

In some embodiments, modifying the metadata associated with the RAID stripe may include, for example, modifying the first metadata as shown in Table 1. For example, the storage processor 110 can modify the RAID type to RAID 6, and amend the width to the original width plus 1 (i.e., 6). Moreover, the storage processor 110 can also modify the mapping table included in the first metadata, to record the position information of the allocated additional extent in the mapping table associated with the RAID stripe.

Figure 7:
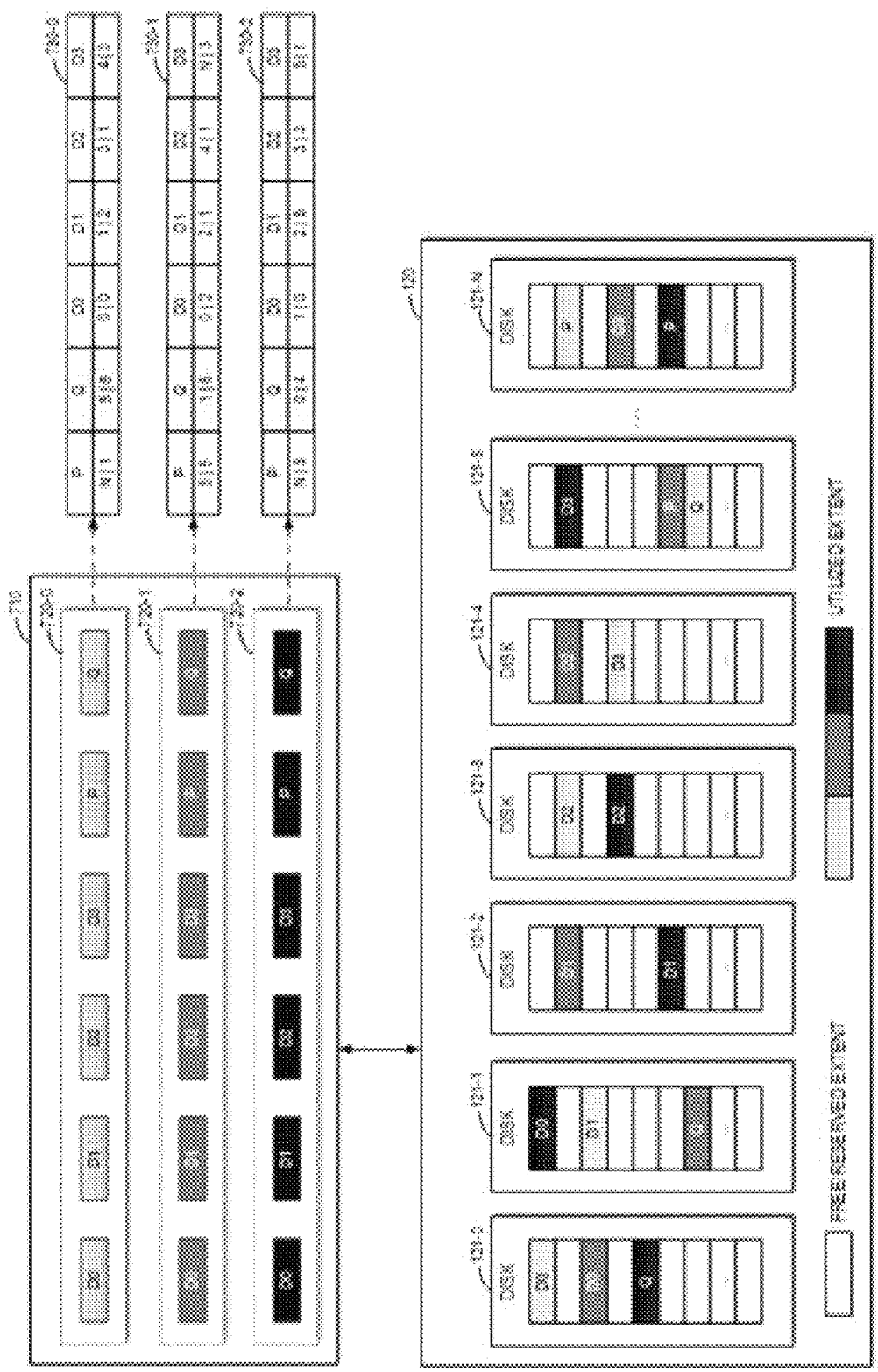
FIG. 7 illustrates a schematic diagram of an exemplary layout of a converted disk array group according to embodiments of the present disclosure.

FIG. 7 illustrates a schematic diagram of exemplary layout of RG 710 having a type of RAID 6, where the RG 710 can be derived by converting the RG 210 as shown in FIG. 2. According to FIG. 7, the RG 710 may include 3 RAID stripes 720-0, 720-1 and 720-2 (collectively known as RAID stripe(s) 720). The RAID stripe 720-0 may be derived by allocating an additional extent to the RAID stripe 220-0 as shown in FIG. 2. The RAID stripe 720-1 may be derived by allocating an additional extent to the RAID stripe 220-1 as shown in FIG. 2. The RAID stripe 720-2 may be derived by allocating an additional extent to the RAID stripe 220-2 as shown in FIG. 2. The respective additional extent allocated in each of the RAID stripes 720, for example, may be the extent for storing additional parity information Q, since each RAID stripe in the RAID 6 includes 4 data extents and 2 parity extents.

FIG. 7 further illustrates mapping tables 730-0, 730-1 and 730-2 (collectively known as mapping table 730) corresponding to the RAID stripes 720-0, 720-1 and 720-2 respectively. Each of the mapping tables 730 can be obtained by modifying the respective mapping table 230 as shown in FIG. 2. In some embodiments, the storage processor 110 can derive a respective mapping table 730 by inserting the position information about the parity information Q (e.g., the position information indicates that the parity information Q is specifically stored in which extent of which disk) into each of the mapping tables 230. As shown in FIG. 7, the parity information Q in the RAID stripe 720-0, for example, is stored in the $6^{th}$ extent of the $5^{th}$ disk (i.e., the disk 121-5). Therefore, the value of the entry associated with the additional parity information Q can be "5|6" in the modified mapping table 730-0. Similarly, the additional parity information Q in the RAID stripe 720-1, for example, is stored in the 6$^{th}$ extent of the 1$^{st}$ disk (i.e., the disk 121-1), so the value of the entry associated with the additional parity information Q can be "1|6" in the modified mapping table 730-1. The additional parity information Q in the RAID stripe 720-2 is stored, for example, in the 4$^{th}$ extent of the 0$^{th}$ disk (i.e., the disk 121-0), so the value of the entry associated with the additional parity information Q can be "0|4" in the modified mapping table 730-2. Moreover, the position information associated with the user data D0-D3 in the mapping tables 730 can be correspondingly moved behind the position information associated with the additional parity information Q.

In some embodiments, modifying the metadata associated with the RAID stripe may include modifying, for example, the second metadata shown in Table 2, so as to enable the rebuilding process for the second RAID. Through the above process of allocating the additional extents and modifying the first metadata including the mapping table, the disk array 130 has been converted from RAID 5 to the RAID 6 in the degraded mode. Although it has determined the position for the additional parity information Q in each stripe, the value of the additional parity information Q has not been written into the position yet. That is, although the type of the disk array 130 has been converted into RAID 6, it is in the degraded mode, which needs to be recovered to a normal mode through a rebuilding process (i.e., computing and writing the value of the additional parity information Q). For example, the storage processor 110 can modify the rebuild position, to indicate that the extent storing the additional parity information Q needs to be rebuilt. In addition, the storage processor 110 also can set the rebuild indicator, to indicate that the rebuilding process is enabled.

Returning back to FIG. 5, the method 500 proceeds to block 540, where the storage processor 110 initiates, based on the modified metadata, a rebuilding process for the second RAID (i.e., the converted disk array 130 in the degraded mode), so as to convert the second RAID from the degraded mode to the normal mode. In some embodiments, for example, the storage processor 110 may initiate a rebuilding process for the second RAID based on the rebuild position and the rebuild indicator in the modified second metadata. Additionally or alternatively, in some embodiments, the rebuilding process can be initiated in the form of a background service. The above described value of the additional parity information Q can be calculated by a particular algorithm and written into a corresponding extent through the rebuilding process, such that the disk array 130 is converted from the degraded mode to the normal mode.

In some embodiments, the method also can include additional actions not shown in FIG. 5. For example, in some embodiments, in response to receiving an I/O request for the disk array 130 before performing the above RAID type conversion, the storage processor 110 can queue the I/O request, to suspend sending the I/O request to the disk array 130. In some embodiments, for example, before converting the disk array 130 from RAID 5 to RAID 6, the storage processor 110 can queue the I/O request for the disk array 130 received from the users, to suspend sending the I/O request to the disk array 130. As described above, the entire conversion process does not need to migrate user data (i.e., D0-D3), so the duration of the process is quite short. In this case, suspending the transmission of the user I/O to the disk array 130 to be converted prior to the conversion will not significantly impact the response time of the user I/O.

Additionally, in some embodiments, in response to completing the conversion of the disk array 130 from RAID 5 to RAID 6 in the degraded mode (e.g., before initiating the rebuilding process), the storage processor 110 may send the queued I/O request to the disk array 130 with a type of RAID 6 in the degraded mode. At this moment, although the disk array 130 is in the degraded mode, it still can normally serve the I/O request from the upper-layer application. In this way, embodiments of the present disclosure can improve reliability of the disk array 130 without influencing the user I/O.

In some embodiments, the method 500 can be executed as a transaction, so as to ensure atomicity of the entire conversion process. For example, in some embodiments, in response to failure of any operation prior to initiating the rebuilding process for the second RAID, the storage memory 110 can cause the storage system to roll back to the state before the execution of the method 500. In other words, the disk array 130 will be restored to the state of RAID 5 to ensure its availability. In this way, according to embodiments of the present disclosure, even if some operations fail during the conversion process, it will not impact availability of the entire storage system.

It is seen from the above description that embodiments of the present disclosure can a RG from one type (e.g., RAID 5) into another type (e.g., RAID 6) by allocating an additional extent to each of RAID stripes in the RG and modifying the metadata associated with the each of RAID stripes. With the conversion of the RAID type, this solution can improve its reliability without impacting user I/Os for the RG (for example, RAID 6 can tolerate simultaneous failures of two disks, while RAID 5 can only tolerate failures of one disk). Furthermore, during the above conversion process, the present solution requires no additional data migration compared with the traditional RAID type conversion, which results into relatively less system overheads (such as, time and resource expenses and the like). In particular, the present solution ensures atomicity of the entire conversion process with transactions. Therefore, even if some operation fails during the conversion process, it will not impact availability of the entire storage system.

Figure 8:
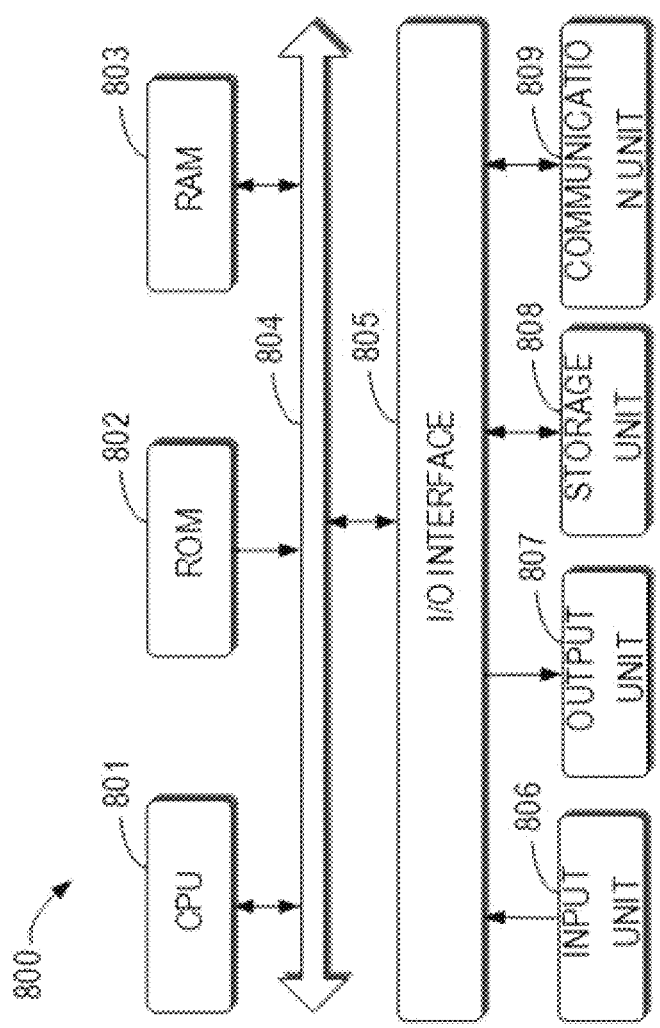
FIG. 8 illustrates a schematic block diagram of an exemplary device applicable to implement embodiments of the present disclosure.

FIG. 8 illustrates a schematic diagram of an example device 800 for implementing embodiments of the present disclosure. For example, the storage processor 110 as shown in FIG. 1 can be implemented by the device 800. As shown, the device 800 includes a central process unit (CPU) 801, which can execute various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operation of the device 800. CPU 801, ROM 802 and RAM 803 are connected to each other via a bus 804. The input/output (I/O) interface 805 is also connected to the bus 804.

A plurality of components in the device 800 is connected to the I/O interface 805, including: an input unit 806, such as keyboard, mouse and the like; an output unit 807, e.g., various kinds of display and loudspeakers etc.; a storage unit 808, such as disk and optical disk etc.; and a communication unit 809, such as network card, modem, wireless transceiver and the like. The communication unit 809 allows the device 800 to exchange information/data with other devices via the computer network, such as Internet, and/or various telecommunication networks.

The above described each procedure and processing, such as method 500, can also be executed by the processing unit 801. For example, in some embodiments, the method 500 can be implemented as a computer software program tangibly included in the machine-readable medium, e.g., storage unit 808. In some embodiments, the computer program can be partially or fully loaded and/or mounted to the device 800 via ROM 802 and/or communication unit 809. When the computer program is loaded to RAM 803 and executed by the CPU 801, one or more actions of the above described method 500 can be implemented.

The present disclosure can be method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (device) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processor of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable those ordinary skilled in the art to understand embodiments of the present disclosure.

We claim:

1. A method for managing a storage system, the storage system including a disk having a plurality of extents, the method comprising:
    obtaining metadata associated with an Redundant Array of Independent Disks (RAID) stripe in a first RAID of a first type, the first RAID including at least a part of extents from the plurality of extents, wherein the RAID of the first type comprises RAID 5, and wherein obtaining the metadata associated with the RAID stripe includes:
        obtaining first metadata that records configuration information of the RAID stripe, the configuration information indicating the first type, wherein the first metadata further includes a field indicating a mapping relationship between the RAID stripe and the at least a part of extents, and
        obtaining second metadata that records state information of the RAID stripe, the state information being related to the rebuilding process, wherein the first metadata is stored in a region of the RAID stripe located at a top of each one of the extents and the second metadata is stored in a region of the RAID stripe located at a bottom of each one of the extents, and wherein user data or parity information is stored between the first metadata and the second metadata in each of the extents;
    allocating an additional extent to the RAID stripe;
    converting, based on the allocated additional extent and by modifying the metadata, the first RAID of the first type into a second RAID of a second type in a degraded mode, wherein the RAID of the second type comprises RAID 6, and wherein converting the first RAID of the first type into the second RAID of the second type in the degraded mode includes increasing an original width indicating a number of disk extents included in the RAID stripe by one and storing, in the second metadata, at least one position in the extents for subsequently writing additional parity information within the stripe to support RAID 6; and
    initiating, based on the modified metadata, a rebuilding process for the second RAID, so as to convert the second RAID from the degraded mode to a normal mode, wherein the rebuilding process for the second RAID converts the second RAID from the degraded mode to the normal mode by calculating the additional parity information and writing the additional parity information to the at least one position stored in the metadata when the first RAID of the first type was converted to the second RAID of the second type in the degraded mode.

2. The method of claim 1, further comprising:
    in response to receiving an input/output (I/O) request for the first RAID before converting the first RAID into the second RAID, queuing the I/O request to suspend sending to the first RAID; and
    in response to completion of the conversion of the first RAID to the second RAID in the degraded mode, sending the queued I/O request to the second RAID.

3. The method of claim 1, wherein modifying the metadata comprises:
    modifying the first metadata based on the allocated additional extent, such that the configuration information indicates the second type; and
    modifying the second metadata, so as to enable the rebuilding process for the second RAID.

4. The method of claim 3, wherein modifying the first metadata comprises:
    modifying, based on the allocated additional extent, the field indicating the mapping relationship.

5. The method of claim 1, further comprising:
    in response to a failure of any of the obtaining, the allocating, the modifying and the converting before the first RAID of the first type is converted into the second RAID of the second type, causing the storage system to be restored to a state associated with the first RAID.

6. A device for managing a storage system, the storage system including a disk having a plurality of extents, the device comprising:
    at least one processing unit;
    at least one memory coupled to the at least one processing unit and storing instructions for execution by the at least one processing unit, the instructions, when executed by the at least one processing unit, causing the device to perform actions comprising:
        obtaining metadata associated with an Redundant Array of Independent Disks (RAID) stripe in a first RAID of a first type, the first RAID including at least a part of extents from the plurality of extents, wherein the RAID of the first type comprises RAID 5, and wherein obtaining the metadata associated with the RAID stripe includes:
            obtaining first metadata that records configuration information of the RAID stripe, the configuration information indicating the first type, wherein the first metadata further includes a field indicating a mapping relationship between the RAID stripe and the at least a part of extents, and
            obtaining second metadata that records state information of the RAID stripe, the state information being related to the rebuilding process, wherein the first metadata is stored in a region of the RAID stripe located at a top of each one of the extents and the second metadata is stored in a region of the RAID stripe located at a bottom of each one of the extents, and wherein user data or parity information is stored between the first metadata and the second metadata in each of the extents;
        allocating an additional extent to the RAID stripe;
        converting, based on the allocated additional extent and by modifying the metadata, the first RAID of the first type into a second RAID of a second type in a degraded mode, wherein the RAID of the second type comprises RAID 6, and wherein converting the first RAID of the first type into the second RAID of the second type in the degraded mode includes increasing an original width indicating a number of disk extents included in the RAID stripe by one and storing, in the second metadata, at least one position in the extents for subsequently writing additional parity information within the stripe to support RAID 6; and initiating, based on the modified metadata, a rebuilding process for the second RAID, so as to convert the second RAID from the degraded mode to a normal mode, wherein the rebuilding process for the second RAID converts the second RAID from the degraded mode to the normal mode by calculating the additional parity information and writing the additional parity information to the at least one position stored in the metadata when the first RAID of the first type was converted to the second RAID of the second type in the degraded mode.

7. The device of claim 6, wherein the actions further comprise:
in response to receiving an input/output (I/O) request for the first RAID before converting the first RAID into the second RAID, queuing the I/O request to suspend sending to the first RAID; and
in response to completion of the conversion of the first RAID to the second RAID in the degraded mode, sending the queued I/O request to the second RAID.

8. The device of claim 6, wherein modifying the metadata comprises:
modifying the first metadata based on the allocated additional extents, such that the configuration information indicates the second type; and
modifying the second metadata, so as to enable the rebuilding process for the second RAID.

9. The device of claim 8, wherein modifying the first metadata comprises:
modifying, based on the allocated additional extent, the field indicating the mapping relationship.

10. The device of claim 6, wherein the actions further comprise:
in response to a failure of any of the obtaining, the allocating, the modifying and the converting before the first RAID of the first type is converted into the second RAID of the second type, causing the storage system to be restored to a state associated with the first RAID.

11. A computer program product for managing a storage system, the storage system including a disk having a plurality of extents, the computer program product comprising:
a non-transitory computer readable medium encoded with computer-executable code, wherein the code is configured for the execution of:
obtaining metadata associated with an Redundant Array of Independent Disks (RAID) stripe in a first RAID of a first type, the first RAID including at least a part of extents from the plurality of extents, wherein the RAID of the first type comprises RAID 5, and wherein obtaining the metadata associated with the RAID stripe includes:
obtaining first metadata that records configuration information of the RAID stripe, the configuration information indicating the first type, wherein the first metadata further includes a field indicating a mapping relationship between the RAID stripe and the at least a part of extents, and
obtaining second metadata that records state information of the RAID stripe, the state information being related to the rebuilding process, wherein the first metadata is stored in a region of the RAID stripe located at a top of each one of the extents and the second metadata is stored in a region of the RAID stripe located at a bottom of each one of the extents, and wherein user data or parity information is stored between the first metadata and the second metadata in each of the extents;
allocating an additional extent to the RAID stripe;
converting, based on the allocated additional extent and by modifying the metadata, the first RAID of the first type into a second RAID of a second type in a degraded mode, wherein the RAID of the second type comprises RAID 6, and wherein converting the first RAID of the first type into the second RAID of the second type in the degraded mode includes increasing an original width indicating a number of disk extents included in the RAID stripe by one and storing, in the second metadata, at least one position in the extents for subsequently writing additional parity information within the stripe to support RAID 6; and
initiating, based on the modified metadata, a rebuilding process for the second RAID, so as to convert the second RAID from the degraded mode to a normal mode, wherein the rebuilding process for the second RAID converts the second RAID from the degraded mode to the normal mode by calculating the additional parity information and writing the additional parity information to the at least one position stored in the metadata when the first RAID of the first type was converted to the second RAID of the second type in the degraded mode.

12. The computer program product of claim 11, wherein the code is further configured for the execution of:
in response to receiving an input/output (I/O) request for the first RAID before converting the first RAID into the second RAID, queuing the I/O request to suspend sending to the first RAID; and
in response to completion of the conversion of the first RAID to the second RAID in the degraded mode, sending the queued I/O request to the second RAID.

* * * * *